(12) United States Patent
Ravanshid et al.

(10) Patent No.: US 10,693,726 B2
(45) Date of Patent: Jun. 23, 2020

(54) METHOD AND DEVICE FOR THE CONFIGURATION OF A TRANSMISSION LINK

(71) Applicant: Bayerische Motoren Werke Aktiengesellschaft, Munich (DE)

(72) Inventors: Azad Ravanshid, Munich (DE); David Gozalvez Serrano, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/714,257

(22) Filed: Sep. 25, 2017

(65) Prior Publication Data

US 2018/0019918 A1 Jan. 18, 2018

Related U.S. Application Data

(63) Continuation of application No. PCT/EP2016/055945, filed on Mar. 18, 2016.

(30) Foreign Application Priority Data

Mar. 26, 2015 (DE) .................. 10 2015 205 478

(51) Int. Cl.
*H04L 1/18* (2006.01)
*H04N 7/52* (2011.01)
(Continued)

(52) U.S. Cl.
CPC ........ *H04L 41/0836* (2013.01); *H04L 1/0017* (2013.01); *H04L 1/0018* (2013.01);
(Continued)

(58) Field of Classification Search
CPC . H04L 41/0836; H04L 1/0017; H04L 1/0018; H04L 1/0019; H04L 1/1887;
(Continued)

(56) References Cited

U.S. PATENT DOCUMENTS

| 5,774,459 A | * | 6/1998 | Charrat | ................ | G06K 7/0008 |
| | | | | | 370/310 |
| 6,914,637 B1 | * | 7/2005 | Wolf | ..................... | H04L 1/0057 |
| | | | | | 348/473 |

(Continued)

FOREIGN PATENT DOCUMENTS

| DE | 10 2013 221 649 A1 | 4/2015 | |
| EP | 1 361 690 A2 | 11/2003 | |
| EP | 1361690 A2 * | 11/2003 | ........... H04L 1/1678 |

OTHER PUBLICATIONS

Schotten, H.D. et al.; "Availability Indication as Key Enabler for Ultra-Reliable Communication in 5G," European Conference on Networks and Communications EuCNC, pp. 1-S, Jun. 2014, (Year: 2014).*

(Continued)

*Primary Examiner* — Edan Orgad
*Assistant Examiner* — Vanneilian Lalchinthang
(74) *Attorney, Agent, or Firm* — Crowell & Moring LLP

(57) ABSTRACT

A method and apparatus for data transmission between a transmitter-side data transmission unit and a receiver-side data transmission unit is provided. The method includes transmitting a first portion of a data packet from a real-time application to the receiver-side data transmission unit, receiving a communication channel availability indicator from the receiver-side data transmission unit, and, if the availability indicator shows that the communication channel is available, adjusting the configuration of the remaining data of the data packet to be transmitted within the maximum permissible data transmission time which is still available for the data packet and transmitting the remaining data to the receiver-side data transmission unit. A transmitter-side (Continued)

data transmission unit and a receiver-side data transmission unit configured to execute the data transmission method are also provided.

19 Claims, 2 Drawing Sheets

(51) Int. Cl.
    *H04L 12/24* (2006.01)
    *H04L 1/00* (2006.01)
    *H04L 1/20* (2006.01)

(52) U.S. Cl.
    CPC .......... *H04L 1/0019* (2013.01); *H04L 1/1887* (2013.01); *H04L 1/20* (2013.01); *H04L 41/083* (2013.01)

(58) Field of Classification Search
    CPC ......... H04L 1/20; H04L 41/083; H04L 65/80; H04L 1/1678; H04L 1/0057
    USPC .......................................... 370/254
    See application file for complete search history.

(56) References Cited

U.S. PATENT DOCUMENTS

| | | | | |
|---|---|---|---|---|
| 2003/0002518 A1* | 1/2003 | Shibutani | .......... | H04W 72/1231 370/442 |
| 2007/0140102 A1* | 6/2007 | Oh | .......... | H04B 7/061 370/208 |
| 2008/0209297 A1* | 8/2008 | Chandra | .......... | H04L 1/1838 714/748 |
| 2012/0300751 A1* | 11/2012 | Arai | .......... | H04L 5/0053 370/336 |
| 2013/0242920 A1 | 9/2013 | Wang et al. | | |
| 2014/0029420 A1* | 1/2014 | Jeong | .......... | H04L 12/5692 370/229 |
| 2014/0247746 A1* | 9/2014 | You | .......... | H04W 24/06 370/252 |
| 2016/0006860 A1* | 1/2016 | Neitzel | .......... | H04M 1/72577 455/419 |

OTHER PUBLICATIONS

German Search Report issued in counterpart German Application No. 10 2015 205 478.0 dated Nov. 26, 2015 with partial English-language translation (Thirteen (13) pages).

International Search Report (PCT/ISA/210) issued in PCT Application No. PCT/EP/2016/055945 dated Sep. 28, 2016 with English-language translation (nine (9) pages).

German-language Written Opinion (PCT/ISA/237) issued in PCT Application No. PCT/EP/2016/055945 dated Sep. 28, 2016 (Eighteen (18) pages).

Goldsmith, A.J. et al.; "Adaptive Coded Modulation for Fading Channels," IEEE Transactions on Wireless Communications, vol. 46, No. 5, pp. 595-602, May 1998.

Ni, M. et al.; "A Channel Feedback Model with Robust SINR Prediction LTE Systems," IEEE European Conference on 20 Antenna and Propagation, EuCAP, pp. 1866-1870, Apr. 2013.

Popovski, P.; "Ultra-Reliable Communication in 5G Wireless Systems," 1$^{st}$ Conference on 5G for Ubiquitous Connectivity 5GU, pp. 146-151, Nov. 2014.

Schotten, H.D. et al.; "Availability Indication as Key Enabler for Ultra-Reliable Communication in 5G," European Conference on Networks and Communications EuCNC, pp. 1-5, Jun. 2014.

Uhlemann, E. et al.; "Deadline Dependent Coding—a Framework for Wireless Real-Time Communication," IEEE Internal Conference on Real-Time Computing Systems and Applications, pp. 135-142, Dec. 2000.

Pfletschinger, Stephan et al.; "Adaptive HARQ for Imperfect Channel Knowledge," Source and Channel Coding (SCC), 2010, International ITG Conference, IEEE, pp. 1-6, Jan. 18, 2010.

* cited by examiner

METHOD AND DEVICE FOR THE CONFIGURATION OF A TRANSMISSION LINK

CROSS REFERENCE TO RELATED APPLICATIONS

This application is a continuation of PCT International Application No. PCT/EP2016/055945, filed Mar. 18, 2016, which claims priority under 35 U.S.C. § 119 from German Patent Application No. 10 2015 205 478.0, filed Mar. 26, 2015, the entire disclosures of which are herein expressly incorporated by reference.

BACKGROUND AND SUMMARY OF THE INVENTION

The invention relates in general to the area of wireless communication with at least one mobile subscriber via a communication channel with varying availability. In particular, the invention relates to a data transmission method as well as an associated data transmission unit, which are improved with regard to the reliability of the data transmission, wherein reliability requirements of services and applications can in particular be taken into account.

On account of its flexibility, cost efficiency and mobility support, wireless data transmission has a broad range of applications beyond conventional mobile communication. Several examples of application are road traffic safety technology, rail traffic control systems, industrial applications and e-health applications. Many applications and services are dependent on the reliability of the data transmission, i.e. the successful and prompt transmission of information. For example, it is necessary in the case of road traffic safety applications based on wireless data transmission that a very high percentage of safety alerts is correctly transmitted within a specific time interval (see Intelligent Transport Systems (ITS); Vehicular Communications; Basic Set of Applications; Definitions, ETSI Technical Report TR 102 638 Rev. 1.1.1, 2009.) Safety alerts that are not delivered or are delivered incorrectly represent a high risk potential.

On the other hand, a wireless data transmission system cannot be designed in practice such that it can ensure a reliable data link at all times and under all circumstances, since such a system would be inefficient and/or associated with high energy consumption.

Various methods are already used in known wireless communication systems to compensate for fluctuations in the transmission quality of the communication channel and to ensure a minimum of reliability of the data transmission for services and applications. Examples of this are the hybrid automatic repeat request (HARQ) and the adaptive modulation and coding (AMC), such as are described for example in A. J. Goldsmith et al., "Adaptive coded modulation for fading channels", IEEE Transactions on Wireless Communications, vol. 46, no. 5, pp. 595-602, May 1998, or in "Physical layer procedures (Release 8)", 3GPP technical specification 36.213 for cellular communication systems, such as for example the 3GPP LTE (Long Term Evolution, LTE).

HARQ is based on the combination of forward error correction (FEC) and repeated transmission of data unusable at the receiver side and is split up into HARQ-type-I and HARQ-type-II. In the case of HARQ-type-I (also plain automatic repeat request, ARQ), erroneous packets are simply deleted and retransmitted. In the case of HARQ-type-II (also HARQ with incremental redundancy, IR-HARQ), an attempt is made to combine the erroneous data transmitted in various repeated transmissions. The probability of a successful transmission is thus increased. HARQ and AMC or other known measures cannot guarantee an error-free and prompt data transmission, i.e. ensure the latter with 100% probability, in cellular communication systems on account of the random fluctuations of the transmission quality of the wireless communication channel.

In the case of data transmission, however, services such as road traffic safety applications require a very high and predictable success rate (e.g. 99.999%) with very short maximum time intervals (e.g. 10 ms) within which the data transmission must take place. It has therefore already been proposed to inform a service or an application, which requires a reliable data transmission, as to the availability or non-availability of a reliable data transmission link. A data transmission method and an associated data transmission unit for the provision of a reliable communication channel for a real-time application is proposed for example in as yet unpublished German patent application DE 10 2013 221 649.1 of the same applicant, wherein the availability of a reliable communication channel is predicted and indicated by means of an availability indicator. The data transmission concept of DE 10 2013 221 649.1 is based on the idea of ascertaining, before the transmission of data, a probability of availability of the communication channel and of transmitting data only when there is sufficient probability of availability. That is to say that a data transmission should only take place when the probability of data transmission errors is very low or approaches zero.

Time interval-dependent coding (deadline dependent coding, DDC), such as is described for example in E. Uhlemann et al., "Deadline dependent coding—a framework for wireless real-time communication", International Conference on Real-Time Computing Systems and Applications", December 2000, pp. 135-142, is a kind of HARQ. In the case of DDC, an attempt is made to meet real-time requirements by means of a data transmission with a specific probability PDL before the lapse of a time interval td. For this purpose, the code rate and the number of transmission repetitions are calculated a priori, such that reliability-relevant parameters td and PDL can be achieved.

Especially services for and applications with safety-relevant functions have high reliability requirements on data transmission links. The reliability requirements are defined here as the successful transmission of data to be transmitted within a specific time interval with a specific probability. Present cellular communication systems do not at present take account of such reliability requirements of services and applications in order to configure the data transmission. This limits the possibilities especially of a cellular communication system to guarantee reliability, and at the same time reduces its efficiency.

In the prior art, such as for example in the aforementioned DDC, reliability requirements of services and applications with regard to the time interval and the probability of a correct data transmission before the lapse of the time interval are only taken into account for the purpose of configuring the size of transmission blocks and the number of transmission repetitions. In the case of DDC, the configuration is calculated a priori, wherein an average is taken over all possible communication channel parameters. It is not therefore possible to adapt the DDC to temporal fluctuations of the transmission properties of the communication channel in real time.

It is the problem of the present invention to specify a data transmission method which is improved in respect to the reliability of the data transmission, in particular with regard to taking account of reliability requirements of real-time services and applications. Furthermore, a corresponding data transmission unit is to be provided, which is configured in particular for the provision of a reliable communication channel for a real-time application or a real-time service. Moreover, a vehicle with a corresponding data transmission unit is to be specified.

A core idea of the invention lies in the concept of integrating the availability indication of a communication channel into a data transmission method based on the HARQ concept, such as for example the DDC. The data transmission method in this case takes account of predetermined reliability requirements of the application or service using the communication channel in the or for the configuration of the data transmission. As a result, the reliability of the data transmission for the service or application is improved on the one hand, but also the efficiency of the overall system.

A first aspect of the invention relates to a method for the data transmission at a transmitter-side data transmission unit comprising the steps:

a) receiving a data transmission request for a data packet from a real-time application which is operatively connected to the data transmission unit;
b) transmitting a first portion of the data packet to a receiver-side data transmission unit via a communication channel;
c) receiving an availability indicator for the communication channel from the receiver-side data transmission unit; and
d) if the availability indicator shows that the communication channel is available, configuring the data of the data packet yet to be transmitted for a successful transmission within the still available time of a maximum permissible data transmission time determined by the real-time application for the data packet, and transmitting the data packet.

In step a), information concerning the amount of data and/or the maximum permissible data transmission time and/or a maximum permissible transmission error rate can be transmitted from the real-time application to the transmitter-side data transmission unit. These boundary condition data can also be transmitted with the one first portion of the data packet to the receiver-side data transmission unit and/or can be pre-configured in the receiver-side data transmission unit and/or can be stored retrievably in a central database (a server) of the communication system.

The transmission of the first portion of the data packet serves as a basis for the receiver-side prediction of the availability of the communication channel for the current transmission horizon. The current transmission horizon is understood here to mean the difference arising from the maximum permissible data transfer time for the data packet less the already elapsed time for one or, as the case may be, more (yet to be explained) transmissions of the first portion that have already taken place plus any pauses etc. within the current data transmission time.

The first portion of the data packet serves as a basis for a receiver-side measurement of parameters (relevant for the transmission reliability) of the communication channel for predicting the availability of the communication channel.

The length of the first portion of the data packet can be determined by setting a specific number of information symbols and/or timeslots. The length of the first portion can be determined in particular with regard to the current transmission horizon and the time variance of the parameters of the communication channel. The first portion is preferably set short in the case of very rapidly fluctuating parameters of the communication channel. The first portion is preferably set long in the case of slowly fluctuating parameters of the communication channel. The length of the first portion is preferably determined on the basis of the coherence time of the communication channel. The length of the first portion is not therefore dependent on the maximum permissible data transmission time. In general, it is recommended, in the case of a very rapidly fluctuating communication channel (e.g. when travelling at high speed), to provide the length of the first portion with several milliseconds (ms). In the case of a slowly fluctuating communication channel (e.g. when travelling at lower speed), on the other hand, the length of the first portion can amount to several hundred ms.

The coherence time of the communication channel is understood here to mean the time interval within which the coefficients of the impulse response of the communication channel can be assumed to be constant.

The method can also comprise the following steps:
e) if the availability indicator shows that the communication channel is not available, termination of the transmission of the data packet; and
f) after a predetermined pause, repetition of the method from step b), if sufficient time for the transmission of the data packet is still available up to the lapse of the maximum permissible data transmission time for the data packet, i.e. up to the current transmission horizon.

The configuration of the data of the data packet yet to be transmitted for a successful transmission within the still available time of a maximum permissible data transmission time determined by the real-time application for the data packet includes in step iv): adjustment of the number and length of data blocks of the data packet yet to be transmitted taking account of transmission repetitions of individual data blocks that are to be expected.

The transmitter-side data transmission unit can, if it has been ascertained that the communication channel is not available, terminate a data transmission link to the associated receiver-side data transmission units and release the assigned communication channel for use by another data transmission units. This can preferably be implemented already on or in the physical (PHY) and/or Medium Access Control (MAC) layer of the transmission protocol used. An opportunistic allocation of subscribers to communication channels of a communication system can thus be achieved based on the availability of the communication channel ascertained at the time. This is particularly advantageous for the efficiency of communication systems with a plurality of subscribers (multi-user system), in which different messages are to be transmitted to different subscribers in the coverage range of the communication system. The transmitter-side data transmission unit can for example be a base station of a mobile radio system and can be set up to assign communication channels, as a limited radio resource of the mobile radio system, only to those subscribers for whom a positive availability has been established according to the reliability requirements of the application or service of the communication channel using said communication channel. In other words, for those subscribers for whom the availability of the communication channel has been determined as not available, an initiated data transmission is stopped until more favorable communication channel properties are available, i.e. the communication channel is available according to the criteria defined here.

A second aspect of the invention relates to a method for data transmission at a receiver-side data transmission unit comprising the steps:
i) receiving a first portion of a data packet from a transmitter-side data transmission unit via a communication channel;

ii) determining an availability indicator for the availability of the communication channel on the basis of parameters of the communication channel measured during the reception of the first portion of the data packet and on the basis of the predicted parameters of the communication channel for the still available remainder of a predetermined maximum permissible data transmission time for the transmission of the data packet;
iii) transmitting of the determined availability indicator to the transmitter-side data transmission unit;
iv) receiving the remaining data packet if the determined availability indicator shows that the communication channel is available.

The determination of the availability of the communication channel in step b) preferably takes place on the basis of parameters of the communication channel measured during the transmission of the first portion of the data packet and predicted for the remaining period up to the current transmission horizon.

The parameters for the communication channel can be one of or a combination of the following: an ACK statistic, a NACK statistic, SINR values, fluctuation values in respect of the communication channel in the time range, coherence times of the communication channel, an amount of an intercarrier interference in an orthogonal frequency multiplex system (OFDM), a Doppler frequency, CQI values, RSSI values, RSRQ values, RSCP values, MIMO-Rank values, Ec/Io value, QCI value.

With regard to the aforementioned parameters, reference should be made to the following brief explanations:

ACK (ACKnowledge) describes a signal for confirming a data transmission.

NACK (Not ACKnowledged) describes the rejection of transmitted data and its acknowledgement.

SINR (Signal-to-Interference-and-Noise-Ratio) is the signal-to-noise ratio.

CQI (Channel Quality Indicator, CQI) is a measurement value for the communication quality of a wireless communication channel.

RSSI (Received Signal Strengths Indicator) is an indicator of the reception field strength of a wireless communication channel.

RSRQ (Reference Signal Received Quality) is a calculated ratio which results from the value for RSRP and the RSSI; the RSRQ serves to assess an LTE link or the reception quality of the mobile terminals.

RSCP (Received Signal Code Power) describes the power measured at the receiver of a communication channel.

Ec/Io indicates the ratio of the average power of the communication channel to the total signal strength.

MIMO-Rank (Multiple-Input-and-Multiple-Output Rank) denotes in communication engineering the use of a plurality of transmission and reception antennas for wireless communication, wherein Rank describes the ratio to one another.

QCI (Quality Class Indicator) is used in LTE technology to split up different applications with different "packets delay budgets" and "packet error loss rates".

Step iv) can also comprise: 1) calculating a value for the accumulated mutual information content (ACcumulated Mutual Information, ACMI) after each transmission repetition of a data block of the data packet and 2) comparing the calculated ACMI value with the ACMI value according to the estimated parameters for the communication channel; and 3) transmitting an adapted data block size to the transmitter-side data transmission unit to compensate for deviations between the calculated ACMI value and the estimated ACMI value. It is thus possible to compensate for prediction errors in the parameters for the communication channel that have a negative influence on the configuration of the data of the data packet yet to be transmitted for a successful transmission within the still available time up to the current transmission horizon.

A third aspect of the invention relates to a transmitter-side data transmission unit for providing a communication channel for a real-time application, wherein the data transmission unit comprises: at least one data output/reception unit, at least one availability determination unit for determining the availability of a communication channel between the data output/reception unit of the data transmission unit and at least one receiver-side data transmission unit, wherein the availability determination unit is set up to perform a method according to the first aspect of the invention.

A fourth aspect of the invention relates to a receiver-side data transmission unit for providing a communication channel for a real-time application, wherein the receiver-side data transmission unit comprises: at least one data output/reception unit, at least one availability determination unit for determining the availability of a communication channel between the data output/reception unit of the data transmission unit and at least one transmitter-side data transmission unit, wherein the availability determination unit is set up to perform a method according to the second aspect of the invention.

It should be noted that a data transmission unit can be configured both as a transmitter-side data transmission unit according to the third aspect and also as a receiver-side data transmission unit according to the fourth aspect. That is to say that such a data transmission unit can perform both the role of the transmitting data transmission unit and also of the receiving data transmission unit.

A further aspect of the invention thus relates to a data transmission unit for providing a communication channel for a real-time application, wherein the data transmission unit comprises: at least one data output/reception unit, at least one availability determination unit for determining the availability of a communication channel between the data output/reception unit of the data transmission unit and at least one transmitter-side data transmission unit, wherein the availability determination unit is set up to perform the method according to the first and the second aspect of the invention.

The data transmission unit of the third, fourth and further aspect of the invention can also comprise: an availability output unit, which is configured for outputting the availability indicator, and/or a data transmission request unit, which is configured for triggering an availability request to the availability determination unit.

The data transmission unit of the fourth and further aspect of the invention preferably comprises, for its receiver-side role, one or more detection units for detecting at least one of the aforementioned parameters of the communication channel, which detection unit is set up to transmit the detected or measured parameter data to the availability determination unit. The data ascertained by the unit or the units for monitoring the communication channel parameters are sent or transmitted to the availability determination unit, so that the availability of the communication channel can be determined inter alia depending on these parameters.

A fifth aspect of the invention relates to a data communication system with at least one transmitter-side data transmission unit according to the third or further aspect of the invention and a receiver-side data transmission unit according to the fourth or further aspect of the invention.

The data transmission units preferably serve to provide a communication channel for a real-time application. The communication channel is preferably constituted between a transmitter-side data transmission unit according to the invention and at least one further receiver-side data transmission unit.

The receiver-side and/or transmitter-side data transmission unit can also be a base station of a communication network, so that a data transmission or the provision of a communication channel for a real-time application between a data transmission unit according to the invention and a further data transmission unit can take place via the communication network. The data transmission units can also each be regarded and constituted as devices and can comprise corresponding device features such as for example electrical components, an electronic circuit, a microprocessor for processing commands of a computer program and so forth, so that a method sequence according to the invention is implemented in each case.

The interaction of the method for the data transmission to a transmitter-side data transmission unit with the method for the data transmission to a receiver-side data transmission unit is explained below by way of example.

At a time $t_i$, a message $m_i$ concerning J transmission blocks with a length of $\tau_{ij}$ timeslots (it should be assumed in the example that the duration of each timeslot corresponds to the time duration for the transmission of one bit), i.e. $\tau_{ij} \in \mathbb{N}$ and $j=1, \ldots, J$ with a maximum transmission time T required by the real-time application, is to be transmitted to the transmitter-side data transmission unit, wherein $\Sigma_j \tau_{ij} \leq T$ applies. After reception of the transmitted transmission blocks over a first number $\omega_i$ of timeslots, a parameter relevant to the availability of the communication channel, for example the signal-to-noise ratio SINR for the following $T-\omega_i$ timeslots up to maximum transmission time T, is predicted or estimated at the receiver-side data transmission unit. The prediction can take place for example by means of a linear extrapolation, such as is explained for example in M. Ni et al., "A channel feedback model with robust SINR prediction LTE systems", IEEE European Conference on Antenna and Propagation, EuCAP, pages 1866-1870, 2013.

On the basis of the parameter (e.g. SINR) measured for the communication channel during the first timeslots $\omega_i$ and parameter values (e.g. SINR) predicted for the following timeslots $T-\omega_i$, the receiver-side data transmission unit determines the availability of the communication channel, i.e. whether the communication channel is sufficiently reliable. The availability thus determined is communicated by the receiver-side data transmission unit to the transmitter-side data transmission unit by means of the availability indicator.

If the communication channel has been determined as sufficiently reliable, i.e. the latter is classified as available, the data transmission of the message can be continued up to the end of the transmission block. Otherwise, if the communication channel has been determined as not sufficiently reliable, i.e. the latter is classified as not available, the data transmission can be terminated. The data already received up to then at the receiver-side data transmission unit up to time $t_i + \omega_i$, which are present for example in a receive buffer memory, are discarded.

As already described above, the transmitter-side data transmission unit can repeat the transmitter-side process after a predetermined pause $\delta$, as long as sufficient time is still available up to the lapse of the maximum permissible transmission time T. The receiver-side data transmission device will then also re-determine, always after the transmission of the first $\omega_i$ bit, the availability of the communication channel, as described above, as long as sufficient time is still available for the transmission of the data packet, i.e.

$$\sum_{j=1}^{J} \tau_{ij} + (J-1)\vartheta \leq T - n(\omega_i + \delta),$$

wherein $\vartheta$ is a runtime delay between successive transmission blocks, and n is the counter to establish how often the communication channel has been classified as not available, i.e. not sufficiently reliable.

A sixth aspect of the invention relates to a vehicle with a transmitter-side data transmission unit according to the third aspect of the invention and/or a receiver-side data transmission unit according to the fourth aspect of the invention or a data transmission unit according to the further aspect of the invention.

The vehicle preferably comprises a processor which implements the real-time application, in particular a driver-assistance functionality, such as for example a brake assist system. Similar advantages arise as those that have already been described in connection with the transmitter-side and receiver-side data transmission unit.

When the real-time application implements a driver-assistance functionality, the data transmission unit of the vehicle can be connected to at least one sensor for determining a vehicle parameter under operating conditions for transmitting sensor data to the availability determination unit. The sensor can be set up to determine the vehicle speed and/or to determine the direction of travel and/or to determine the distance from an obstacle. The sensor can be at least one camera and/or a radar system and/or a LIDAR system.

The determination of the availability of the communication channel in step c) of the method according to the second aspect can take place depending on vehicle parameters, in particular depending on a vehicle speed and/or a direction of travel of the vehicle and/or positional data of the vehicle and/or a distance from another vehicle.

The availability of the communication channel can be indicated to a driver of the vehicle in a display unit of the vehicle, preferably by means of a symbol in a driver information system, for example in an instrument cluster or a head-up display. The display of the availability indicator can take place as an absolute display, i.e. a display can take place as to whether a communication channel is available or not. In this connection, a distinction needs to be made solely between two display symbols. If the display unit for indicating the availability of the communication channel indicates for example no availability of the communication channel, the driver can conclude from this that his vehicle cannot establish a connection or a communication with other vehicles. For example, this may mean that a brake assist system of the vehicle cannot receive the signals of a vehicle travelling in front. The driver is thus informed that the brake assist system is possibly not automatically engaging, so that the driver is required to maintain a raised state of awareness. The lack of availability of a communication channel may also mean that a data link to a service which runs on a back-end server, which can be reached via a base station of a communication network, cannot be established. Such a service may for example be an information service for the current traffic situation. With the lack of a data link, the driver knows that the traffic situation data used in his navigation system are not up to date or are not present and traffic jams are not therefore avoided etc.

The driver assistance functionality can for example be set up, on the basis of the availability of the communication channel, to make a decision to initiate a driver assistance measure, in particular to initiate a steering intervention and/or a vehicle acceleration and/or a braking action and/or a speed reduction in a first mode and/or a second mode. The driver assistance functionality is preferably operated in the first mode as a function of data received from the communication channel and in the second mode as a function of data of the at least one sensor for determining a vehicle parameter. A switch from the first mode into the second mode and vice versa preferably takes place depending on the availability of the communication channel.

It should be noted that the data transmission unit can in principle be a mobile communication device, e.g. a cellular telephone, but also an on-board computer of a vehicle with corresponding communication interfaces.

The data output/data reception unit may be a close-range radio unit, such as for example a Wi-Fi unit and/or a Bluetooth unit and/or a ZigBee unit, but also in addition or alternatively a mobile radio unit. As a mobile radio unit, the latter can be based for example on a 3GPP standard, such as the LTE standard or a future mobile radio standard, such as for example the 5G standard. The data output/data reception unit can of course be based, alternatively or in addition, on another communication standard for wireless communication, such as for example the 802.11p or a future standard.

Moreover, it should be noted that, insofar as the data transmission unit is implemented not in a vehicle, but other systems or units, the real-time application can for example be automatic rail traffic control systems, e-health services and comparable industrial applications.

Finally, it should be noted that the methods and data transmission units according to the invention can be used not only in automotive applications, but also on all other wireless transmission systems or applications. This applies both to wireless communication systems which are based on a direct device-to-device communication, such as for example the standard 802.11p, or on an infrastructure-based communication, such as for example 3GPP LTE.

Further objects, advantages, features and details of the invention emerge from the following description, in which an embodiment of the invention is described in detail making reference to the drawings. The features mentioned in the claims and in the description here can be essential to the invention in each case individually in themselves or in any combination. The aforementioned features and the further features mentioned here can likewise each be used in themselves or in a plurality thereof in any combinations. Identical components or components with similar functions are in part provided with identical reference numbers. The terms "left", "right", "above" and "below" used in the description of the embodiments relate to the drawings in an orientation such that the reference numbers and names of the figures can be read normally. The embodiment shown and described is not to be understood as conclusive, but is in the nature of an example to explain the invention. The description serves to inform the person skilled in the art, so that known circuits, structures and methods are not shown or explained in detail in the description in order not to make the understanding more difficult.

DETAILED DESCRIPTION OF THE DRAWINGS

Figure 1:
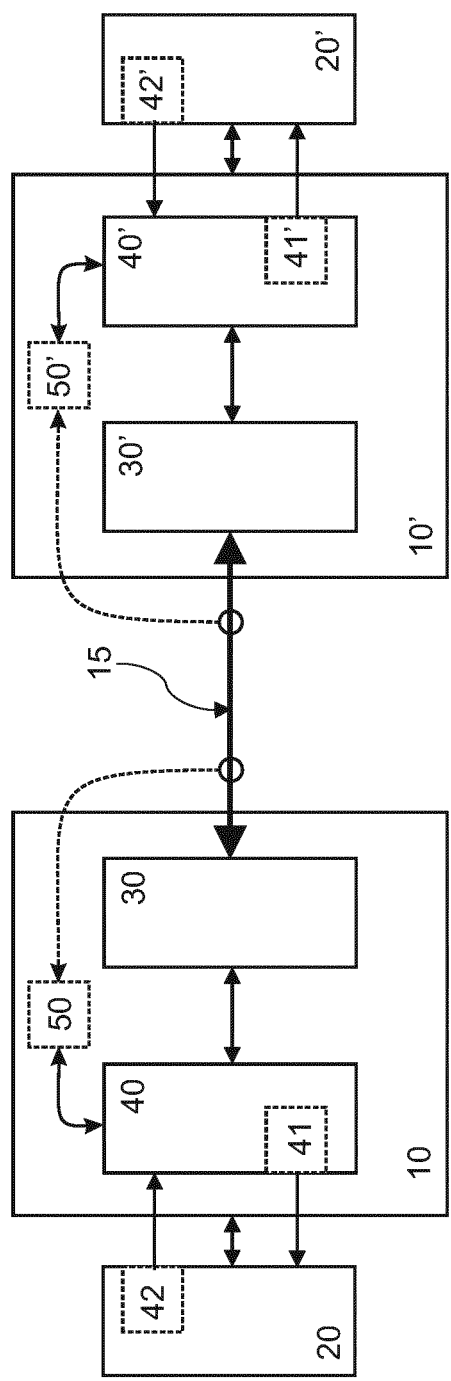
FIG. 1 illustrates diagrammatical a data transmission method between two data transmission units via a communication channel in accordance with an embodiment of the present invention.

FIG. 1 shows a first data transmission unit 10 and a second data transmission unit 10', which provide a communication channel 15 for data transmission between a transmitter-side real-time application 20 and a receiver-side real-time application 20'.

Real-time applications 20, 20' may for example each be a vehicle safety application, such as for example a brake assist of a driver assistance system. First and second data transmission unit 10, 10' are than respectively located in an associated first and second vehicle. In other words, real-time applications 20, 20' may implement identical or complementary functions.

The real-time application may however also be a client real-time application 20' in a driver information system of a vehicle, which communicates via a data link with a host real-time application 20 on a back-end server. Second data transmission unit 10' is then located in an associated vehicle and first data transmission unit 10 for example in a base station of a radio communication network or mobile communication network, such as for example the latest 3GPP LTE mobile communication network. A service which informs subscribers about the present traffic situation (traffic density, traffic jams etc.) may run for example as host real-time application 20 on the back-end server. In the case of client real-time application 20', it may then for example be a navigation system of the vehicle, which graphically displays the current traffic situation to the driver or takes account of the information concerning the present traffic situation in the navigation. In other words, client real-time application 20' consumes the service that is provided by host real-time application 20. A client-server relationship thus exists between real-time applications 20, 20'.

First and second data transmission unit 10, 10' comprises in each case a data output/data reception unit 30, 30' and in each case an availability determination unit 40, 40'. Availability determination units 40, 40' each serve to determine the availability of communication channel 15 between data transmission units 10, 10'—put more precisely, between data output/data reception units 30, 30', which are each connected to associated real-time application 20, 20'.

The embodiments for data transmission units 10, 10' represented in FIG. 1 are identically constituted data transmission units. That is to say that both first and second data transmission unit 10, 10' may each function as a transmitting as well as a receiving data unit.

For the sake of simplification and on account of the identical design, the design of data transmission units 10, 10' is described below solely on the basis of the example of first data transmission unit 10. Thus, an availability output unit 41 is further provided as part of availability determination unit 40, which availability output unit is configured for outputting an availability indicator for communication channel 15. The availability indicator may be obtained from real-time application 20 by a data transmission request unit 42.

Data output/data reception unit 30 is configured to transmit data packets reliably within a fixed time window (as maximum permissible data transmission time) via communication channel 15. For this purpose, availability determination unit 40 determines, in the interaction with receiver-side availability determination unit 40' yet to be explained, the availability of communication channel 15. The determined availability indicator may be transmitted with the aid of availability output unit 41 to real-time application 20.

Within the scope of the data transmission method proposed here, a data transmission request from real-time application 20 is received in a first step by data transmission unit 10. Availability determination unit 40 then determines the availability of communication channel 15. As part of the data transmission request, information concerning the amount of data and/or the maximum permissible data transmission time and/or the maximum permissible transmission error rate may be transmitted by real-time application 20 as reliability requirements to data transmission unit 10, in particular to availability determination unit 40.

Availability determination unit 40 determines, taking account of the communicated reliability requirements for the data to be transmitted, the availability of communication channel 15.

The availability may then be transmitted to real-time application 20 with the aid of availability output unit 41. Availability determination unit 40 essentially establishes whether the data transmission request by real-time application 20 can be granted because the requested data transmission can be carried out with the required reliability.

The availability of communication channel 15 is indicated for example by the availability indicator, which may assume a binary value AI, wherein the value AI=1 describes that communication channel 15 may be made available with the required reliability. The output of the value AI=0, on the other hand, indicates that communication channel 15 cannot be made available with the required reliability.

In the described embodiment, real-time application 20 wants to communicate with real-time application 20' with specific reliability requirements via a communication channel 15. Real-time application 20 wants for example to transmit specific information to real-time application 20'. Real-time application 20' may also transmit information to real-time application 20. For example, it is possible for real-time application 20' to request data cyclically from real-time application 20 using data transmission unit 10'.

Figure 2:
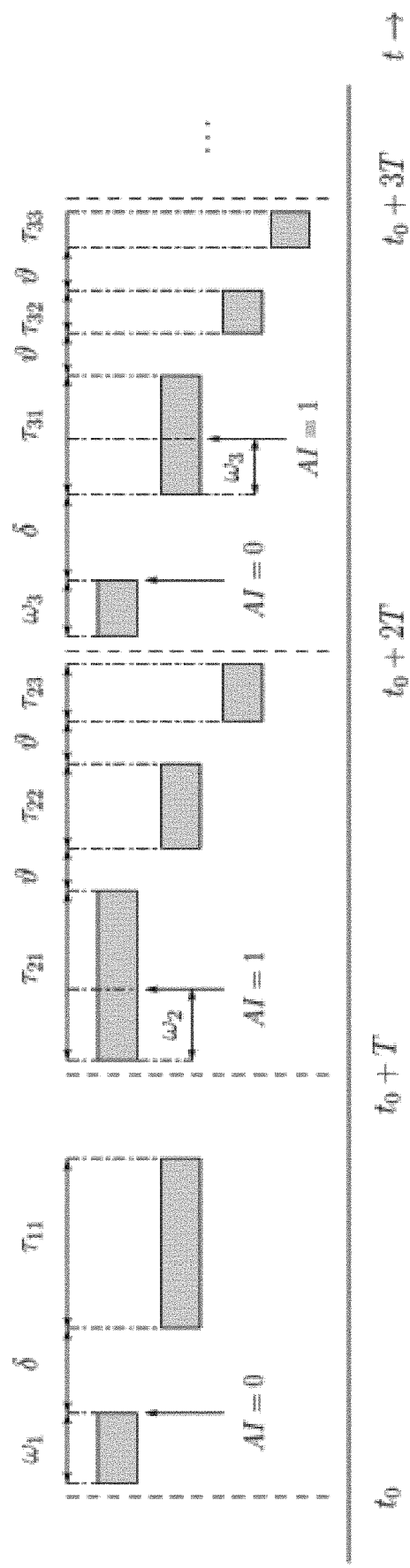
FIG. 2 shows three sequence examples of the data transmission method of FIG. 1.

The methods for data transmission proposed here are explained below by way of example on the assumption that first data transmission unit 10 as a transmitter wants to transmit data to second data transmission unit 10'. With regard to the examples in FIG. 2, the corresponding reference numbers of FIG. 2 are used below for a better understanding.

In the first place (step a), first data transmission unit 10 receives a data transmission request for a data packet $T_{11}$, $T_{21}$, $T_{22}$, $T_{23}$, $T_{31}$, $T_{32}$, $T_{33}$ from real-time application 20 operatively connected to data transmission unit 10. Then (step b), data output/data reception unit 30 transmits, under control of availability determination unit 40, a first portion $\omega_1$, $\omega_2$, $\omega_3$ of data packet $T_{11}$, $T_{21}$, $T_{22}$, $T_{23}$, $T_{31}$, $T_{32}$, $T_{33}$ to receiver-side second data transmission unit 10' via communication channel 15.

First of all (step i), first portion $\omega_1$, $\omega_2$, $\omega_3$ of data packet $T_{11}$, $T_{21}$, $T_{22}$, $T_{23}$, $T_{31}$, $T_{32}$, $T_{33}$ is received at second data transmission unit 10' with second data output/data reception unit 30' there, said first portion having been transmitted via communication channel 15 by transmitter-side first data transmission unit 10. Then (step ii), second availability determination unit 40' of second data transmission unit 10' determines the availability of communication channel 15 on the basis of parameters of communication channel 15 measured during the reception of first portion $\omega_1$, $\omega_2$, $\omega_3$ of data packet $T_{11}$, $T_{21}$, $T_{22}$, $T_{23}$, $T_{31}$, $T_{32}$, $T_{33}$ and on the basis of estimated parameters of communication channel 15 for the still available remainder of a predetermined maximum permissible data transmission time T for the transmission of data packet $T_{11}$, $T_{21}$, $T_{22}$, $T_{23}$, $T_{31}$, $T_{32}$, $T_{33}$. Thereafter (step iii), second availability determination unit 40' transmits an availability indicator AI for indicating the availability of communication channel 15 to transmitter-side first data transmission unit 10 via second data output/data reception unit 30' and first data output/data reception unit 30 of first data transmission unit 10 to first availability determination unit 40.

The determination of the availability of communication channel 15 by second availability determination unit 40' may take place inter alia depending on parameters of communication channel 15. Communication channel parameters suitable for this are for example one or more of the following: an ACK statistic, a NACK statistic, an SINR value, transmission fluctuation values of the communication channel in a defined time range, the coherence time of the communication channel, an amount of an intercarrier interference in an orthogonal frequency multiplex system (OFDM), a Doppler frequency, a CQI value, an RSSI value, an RSRQ value, an RSCP value, a MIMO-Rank value, an Ec/Io value, a QCI value. For the monitoring and/or determination of an optional number of these stated parameters, data transmission units 10, 10' and/or availability determination units 40, 40' each comprise a corresponding communication channel parameter unit 50, 50'.

At first data transmission unit 10, availability indicator AI for communication channel 15 is then (step c) received by data output/data reception unit 30 from receiver-side second data transmission unit 10'.

Now (step d), under the control of first availability determination unit 40, if availability indicator AI shows that communication channel 15 is available, first data output/data reception unit 30 is configured for data packet $T_{11}$, $T_{21}$, $T_{22}$, $T_{23}$, $T_{31}$, $T_{32}$, $T_{33}$ for a successful transmission within the still available remainder of maximum permissible data transmission time T of the data of data packet $T_{11}$, $T_{21}$, $T_{22}$, $T_{23}$, $T_{31}$, $T_{32}$, $T_{33}$ yet to be transmitted, said maximum permissible data transmission time being determined by real-time application 20 or 20'. The rest of data packet $T_{11}$, $T_{21}$, $T_{22}$, $T_{23}$, $T_{31}$, $T_{32}$, $T_{33}$ is then transmitted by first data output/data reception unit 30 to second data output/data reception unit 30'. There (step iv), the rest of data packet $T_{11}$, $T_{21}$, $T_{22}$, $T_{23}$, $T_{31}$, $T_{32}$, $T_{33}$ is duly received by second data output/data reception unit 30'.

The configuration of first data output/data reception unit 30 for the transmission of the data of data packet $T_{11}$, $T_{21}$, $T_{22}$, $T_{23}$, $T_{31}$, $T_{32}$, $T_{33}$ yet to be transmitted preferably includes an adjustment of the number and length of data blocks of data packet $T_{11}$, $T_{21}$, $T_{22}$, $T_{23}$, $T_{31}$, $T_{32}$, $T_{33}$ yet to be transmitted taking account of transmission repetitions of individual data blocks that are to be expected.

In step a), information concerning the amount of data and/or maximum permissible data transmission time T and/or a maximum permissible transmission error rate is communicated by real-time application 20 to transmitter-side first data transmission unit 10. This information can also be transmitted to receiver-side second data transmission unit 10' with the one first portion $\omega_1$, $\omega_2$, $\omega_3$ of data packet $T_{11}$, $T_{21}$, $T_{22}$, $T_{23}$, $T_{31}$, $T_{32}$, $T_{33}$. Alternatively or in addition, this information can also already be pre-configured in transmitter-side first or receiver-side second data transmission unit 10 or respectively 10'. It is also possible for this information to be stored at a central point in the communication system, e.g. on a central server, and for it to be able to be retrieved from there by data transmission units 10, 10'.

The transmission of first portion $\omega_1$, $\omega_2$, $\omega_3$ of data packet $T_{11}$, $T_{21}$, $T_{22}$, $T_{23}$, $T_{31}$, $T_{32}$, $T_{33}$ serves as a basis for the receiver-side prediction of the availability of communication channel 15 for the transmission horizon still available. The still remaining transmission horizon is determined as the difference arising from required maximum permissible data transmission time T for data packet $T_{11}$, $T_{21}$, $T_{22}$, $T_{23}$, $T_{31}$, $T_{32}$, $T_{33}$ less the time interval for one or if applicable more (still to be explained in connection with FIG. 2) transmissions of first portion $\omega_1$, $\omega_2$, $\omega_3$ that have already taken place within maximum permissible data transmission time T.

The length of first portion $\omega_1$, $\omega_2$, $\omega_3$ of data packet $T_{11}$, $T_{21}$, $T_{22}$, $T_{23}$, $T_{31}$, $T_{32}$, $T_{33}$ is determined for example by specifying or setting a specific number of information symbols and/or timeslots.

During the transmission of first portion $\omega_1$, $\omega_2$, $\omega_3$ of data packet $T_{11}$, $T_{21}$, $T_{22}$, $T_{23}$, $T_{31}$, $T_{32}$, $T_{33}$, parameters of communication channel 15 are measured at receiver-side data transmission unit 10'. The measured parameters, in particular their time variance, function as a basis for the prediction of the availability of communication channel 15 in respect of transmission horizon T still available. First portion $\omega_1$, $\omega_2$, $\omega_3$ is preferably set short in the case of very rapidly fluctuating parameters of communication channel 15. First portion $\omega_1$, $\omega_2$, $\omega_3$ is preferably set long in the case of slowly fluctuating parameters of communication channel 15. The length of the first portion is preferably determined on the basis of the coherence time of communication channel 15.

When availability indicator AI shows that communication channel 15—according to the required reliability requirements of real-time applications 20, 20'—is not available, transmitter-side first data transmission unit 10 is preferably configured to terminate the current transmission of data packet $T_{11}$, $T_{21}$, $T_{22}$, $T_{23}$, $T_{31}$, $T_{32}$, $T_{33}$ (step e).

After a predetermined pause $\delta$, transmitter-side first data transmission unit 10 is preferably further configured to repeat the method from step b), if sufficient time is still available for a transmission of data packet $T_{11}$, $T_{21}$, $T_{22}$, $T_{23}$, $T_{31}$, $T_{32}$, $T_{33}$ up to the lapse of maximum permissible data transmission time T for data packet $T_{11}$, $T_{21}$, $T_{22}$, $T_{23}$, $T_{31}$, $T_{32}$, $T_{33}$. That is to say that transmitter-side first data transmission unit 10 attempts in this embodiment as long as a transmission of data packet $T_{11}$, $T_{21}$, $T_{22}$, $T_{23}$, $T_{31}$, $T_{32}$, $T_{33}$ within maximum permissible data transmission time T is still possible with available communication channel 15.

In an alternative embodiment, transmitter-side first data transmission unit 10 is configured, if availability indicator AI shows that communication channel 15 is not available (AI=0), to terminate the data transmission link to the associated receiver-side second data transmission units 10' and to release assigned communication channel 15 for use by other data transmission units.

In a another embodiment, the receiver-side second data transmission unit 10' is configured in step iv) to calculate a value for the accumulated mutual information content (accumulated mutual information), ACMI, after each transmission repetition of a data block of data packet $T_{11}$, $T_{21}$, $T_{22}$, $T_{23}$, $T_{31}$, $T_{32}$, $T_{33}$ to be transmitted and to compare the calculated ACMI value with an ACMI value which has been calculated on the basis of estimated parameters for communication channel 15. On the basis of the comparison, receiver-side second data transmission unit 10' then transmits an adapted data block size to transmitter-side first data transmission unit 10, which then uses this value for the configuration of the data blocks. Deviations between the calculated ACMI value and the estimated ACMI value may thus be compensated for.

Finally, the data transmission between data transmission units 10 and 10' proposed here is illustrated in FIG. 1 on the basis of three different cases in FIG. 2.

Example 1

At time $t_i$ in first time interval $[t_0, t_0+T]$, a data packet $m_1$ is ready for transmission at first data transmission unit 10. During the transmission of first portion $\omega_1$ (sub-frame) of coded data packet $\tau_{11}$, it would ascertained at receiver-side data transmission unit 10' that communication channel 15 is not sufficiently reliable. Receiver-side data transmission unit 10' thus transmits to receiver-side data transmission unit 10 availability indicator AI=0, which shows that communication channel 15 is not available. After a predetermined pause with $\delta$ timeslots, transmitter-side data transmission unit 10 attempts to re-transmit data packet $\tau_{11}$. During the second attempt, transmitter-side data transmission unit 10' ascertains that communication channel 15 is sufficiently reliably available for the time interval required for the transmission of the data packet within the permissible maximum transmission time and communicates this to transmitter-side data transmission unit 10 by means of availability indicator AI=1. The data transmission is then prefixed up to the end of data block $\tau_{11}$.

Example 2

At the time of the transmission of data packet $m_2$ in second time interval $[t_0+T, t_0+2T]$, communication channel 15 is shown as reliable by receiver-side data transmission unit 10' by availability indicator AI=1 of transmitter-side data transmission unit 10. Accordingly, three data packets $\tau_{21}$, $\tau_{22}$ and $\tau_{23}$ are transmitted up to the lapse of maximum transmission time T. As already mentioned, the size of data packets $\tau_{21}$, $\tau_{22}$ and $\tau_{23}$ is set according to the properties of communication channel 15 and the remaining time up to the end of maximum transmission time T.

Example 3

The transmission of data packet $m_3$ in third time interval $[t_0+2T, t_0+3T]$ differs from the two preceding examples 1 and 2 solely in that, on account of the non-availability of communication channel 15 in the first transmission attempt, the total data transmission has been delayed by predetermined pause $\delta$.

Finally, it should be noted that the data transmission in each of the time intervals in FIG. 2 may belong to the same subscriber or to different subscribers within the service area of a base station of the cellular radio communication network. In the latter case, first data packet $m_1$ may be intended for a first subscriber, second data packet $m_2$ for a second subscriber, and so forth.

Furthermore, maximum permissible transmission time T does not necessarily have to be constant, but rather can be different in different time intervals. For example, the data transmission of the first subscriber may require as a reliability requirement a maximum transmission time $T_1$, whereas the data transmission of the second subscriber requires as a reliability requirement a maximum transmission time $T_2$, wherein $T_1 \neq T_2$ applies. Finally, it is possible, once communication channel 15 has been classified as not available for a specific subscriber on the basis of the reliability requirements (AI=0), to assign communication channel 15 as a radio resource during pause δ to other subscribers for whom the channel is classified as available (AI=1). The capacity of the entire communication system may thus be improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for data transmission at a transmitter-side data transmission unit, comprising the acts of:
   receiving at the transmitter-side data transmission unit a data transmission request for a data packet initiated by a real-time application operatively connected to the transmitter-side data transmission unit prior to initiating data transfer to a receiver-side data transmission unit;
   transmitting from the transmitter-side data transmission unit a first portion of the data packet to the receiver-side data transmission unit via a communication channel;
   receiving at the transmitter-side data transmission unit an availability indicator for the communication channel in the form of an availability code transmitted from the receiver-side data transmission unit, the availability indicator being determined by the receiver-side data transmission unit based on
      parameters of the communication channel measured during the data packet first portion receiving act, and
      estimated parameters of the communication channel for a portion of the data packet not yet transmitted from the transmitter-side data transmission unit to the receiver-side data transmission unit within an available remainder of a maximum permissible data transmission time; and
   if the availability indicator indicates the communication channel is available,
      configuring using the transmitter-side data transmission unit a portion of the data packet not yet transmitted for transmission within an available remainder of a maximum permissible data transmission time determined by the real-time application for the data packet, and
      transmitting from the transmitter-side data transmission unit the portion of the data packet not yet transmitted to the receiver-side data transmission unit via the communication channel.

2. The method as claimed in claim 1, further comprising the acts of:
   if the availability indicator indicates that the communication channel is not available,
      terminating the transmission of the data packet from the transmitter-side data transmission unit; and
      repeating the transmitting act after a predetermined pause if sufficient time for the transmission of the data packet from the transmitter-side data transmission unit is available within the available remainder of the maximum permissible data transmission time for the data packet.

3. The method as claimed in claim 1, wherein
   the act of configuring the portion of the data packet not yet transmitted for transmission includes adjusting at least one of a number and a length of data blocks of the data packet not yet transmitted based on an expected number of individual data block transmission repetitions.

4. The method as claimed in claim 2, wherein
   the act of configuring the portion of the data packet not yet transmitted for transmission includes adjusting at least one of a number and a length of data blocks of the data packet not yet transmitted based on an expected number of individual data block transmission repetitions.

5. The method as claimed in claim 1, further comprising the acts of:
   if the availability indicator indicates that the communication channel is not available,
      terminating the transmission of the data packet from the transmitter-side data transmission unit; and
      after terminating the transmission of the data packet, releasing the communication channel for use by other data transmission units.

6. A method for data transmission at a receiver-side data transmission unit, comprising the acts of:
   receiving at the receiver-side data transmission unit a first portion of a data packet from a transmitter-side data transmission unit via a communication channel;
   determining at the receiver-side data transmission unit an availability of the communication channel on the basis of
      parameters of the communication channel measured during the data packet first portion receiving act, and
      estimated parameters of the communication channel for a portion of the data packet not yet transmitted from the transmitter-side data transmission unit to the receiver-side data transmission unit within an available remainder of a maximum permissible data transmission time;
   transmitting from the receiver-side data transmission unit an availability indicator based on the determined communication channel availability to the transmitter-side data transmission unit; and
   if the availability indicator indicates the communication channel is available, receiving the portion of the data packet not yet transmitted from the transmitter-side data transmission unit at the receiver-side data transmission unit via the communication channel.

7. A method for data transmission at a receiver-side data transmission unit, comprising the acts of:
   receiving at the receiver-side data transmission unit a first portion of a data packet from a transmitter-side data transmission unit via a communication channel;
   determining at the receiver-side data transmission unit an availability of the communication channel on the basis of
      parameters of the communication channel measured during the data packet first portion receiving act, and
      estimated parameters of the communication channel for a portion of the data packet not yet transmitted from the transmitter-side data transmission unit to the receiver-side data transmission unit within an available remainder of a maximum permissible data transmission time;
   transmitting from the receiver-side data transmission unit an availability indicator based on the determined communication channel availability to the transmitter-side data transmission unit; and
   if the availability indicator indicates the communication channel is available, receiving the portion of the data packet not yet transmitted from the transmitter-side data transmission unit at the receiver-side data transmission unit via the communication channel, wherein in the act of receiving the portion of the data packet not yet transmitted, applying an adapted data block size determined by the receiver-side data transmission unit by calculating a value for an accumulated mutual information content after each transmission repetition of a data block of the data packet, comparing the calculated accumulated mutual information content value with an accumulated mutual information content value based on the parameters for the communication channel, and transmitting the adapted data block size from the receiver-side data transmission unit to the transmitter-side data transmission unit;

adjusting a data block size of data blocks of the portion of the data packet not yet transmitted from the transmitter-side data transmission unit such that a difference between the calculated accumulated mutual information content value and the estimated accumulated mutual information content value is reduced.

8. A transmitter-side data transmission unit configured to transmit a data packet from a real-time application via a communication channel to a receiver-side data transmission unit, comprising:

at least one transmitter-side data output/reception unit; and at least one availability determination unit configured to determine an availability of the communication channel between the at least one transmitter-side data output/reception unit and at least one receiver-side data transmission unit based on parameters of the communication channel measured during transmission of a first portion of the data packet, wherein the at least one transmitter-side data output/reception unit is configured to receive a data transmission request for the data packet from the real-time application operatively connected to the transmitter-side data transmission unit;

transmit the first portion of the data packet from the transmitter-side data transmission unit to the receiver-side data transmission unit via the communication channel;

receive at the transmitter-side data transmission unit an availability indicator for the communication channel from the receiver-side data transmission unit; and if the at least one availability determination unit determines the communication channel is available, configure a portion of the data packet not yet transmitted for transmission within an available remainder of a maximum permissible data transmission time determined by the real-time application for the data packet, and transmit the portion of the data packet not yet transmitted from the at least one data output/reception unit to the receiver-side data transmission unit via the communication channel.

9. The transmitter-side data transmission unit as claimed in claim 8, wherein if the at least one availability determination unit determines that the communication channel is not available, the at least one transmitter-side data output/reception unit is configured to terminate the transmission of the data packet from the transmitter-side data transmission unit and repeat the transmitting act after a predetermined pause if sufficient time for the transmission of the data packet from the transmitter-side data transmission unit is available within the available remainder of the maximum permissible data transmission time for the data packet.

10. The transmitter-side data transmission unit as claimed in claim 8, wherein the at least one transmitter-side data output/reception unit adjusts the portion of the data packet not yet transmitted for transmission by adjusting a number and length of data blocks of the data packet not yet transmitted based on an expected number of individual data block transmission repetitions.

11. The transmitter-side data transmission unit as claimed in claim 9, wherein the at least one transmitter-side data output/reception unit configures the portion of the data packet not yet transmitted for transmission by adjusting a number and length of data blocks of the data packet not yet transmitted based on an expected number of individual data block transmission repetitions.

12. The transmitter-side data transmission unit as claimed in claim 8, wherein if the at least one availability determination unit determines that the communication channel is not available, the at least one transmitter-side data output/reception unit is configured to terminate the transmission of the data packet from the transmitter-side data transmission unit and after terminating the transmission of the data packet, release the communication channel for use by other data transmission units.

13. A receiver-side data transmission unit configured to receive a data packet from a real-time application transmitted by a transmitter-side data transmission unit via a communication channel, comprising:

at least one receiver-side data output/reception unit; and at least one availability determination unit configured to determine an availability of the communication channel between the at least one receiver-side data output/reception unit and at least one transmitter-side data transmission unit based on parameters of the communication channel measured during the receiving of the first portion of the data packet, wherein the at least one receiver-side data output/reception unit is configured to receive a first portion of the data packet from the at least one transmitter-side data transmission unit via the communication channel;

transmit an availability indicator based on the determined communication channel availability to the transmitter-side data transmission unit, the availability indicator being determined by the at least one availability determination unit based on parameters of the communication channel measured during the receiving of the first portion of the data packet, and estimated parameters of the communication channel for a portion of the data packet not yet transmitted from the transmitter-side data transmission unit to the receiver-side data transmission unit within an available remainder of a maximum permissible data transmission time, and if the availability indicator indicates the communication channel is available, receiving the portion of the data packet not yet transmitted from the transmitter-side data transmission unit via the communication channel.

14. A receiver-side data transmission unit configured to receive a data packet from a real-time application transmitted by a transmitter-side data transmission unit via a communication channel, comprising:
 at least one receiver-side data output/reception unit; and
 at least one availability determination unit configured to determine an availability of the communication channel between the at least one receiver-side data output/reception unit and at least one transmitter-side data transmission unit based on parameters of the communication channel measured during the receiving of the first portion of the data packet,
 wherein
  the at least one receiver-side data output/reception unit is configured to
   receive a first portion of the data packet from the at least one transmitter-side data transmission unit via the communication channel;
   transmit an availability indicator based on the determined communication channel availability to the transmitter-side data transmission unit, the availability indicator being determined by the at least one availability determination unit based on
    parameters of the communication channel measured during the receiving of the first portion of the data packet, and
    estimated parameters of the communication channel for a portion of the data packet not yet transmitted from the transmitter-side data transmission unit to the receiver-side data transmission unit within an available remainder of a maximum permissible data transmission time,
   if the availability indicator indicates the communication channel is available, receive the portion of the data packet not yet transmitted from the transmitter-side data transmission unit via the communication channel, and
   in the receiving of the portion of the data packet not yet transmitted from the transmitter-side data transmission unit, the at least one receiver-side data output/reception unit is further configured to cooperate with the transmitter-side data transmission unit to apply an adapted data block size determined by
    calculating a value for an accumulated mutual information content after each transmission repetition of a data block of the data packet,
    comparing the calculated accumulated mutual information content value with an accumulated mutual information content value based on the parameters for the communication channel,
    transmitting the adapted data block size from the receiver-side data transmission unit to the transmitter-side data transmission unit, and
    adjusting a data block size of data blocks of the portion of the data packet not yet transmitted from the transmitter-side data transmission unit such that a difference between the calculated accumulated mutual information content value and the estimated accumulated mutual information content value is reduced.

15. A data communication system comprising:
 a transmitter-side data transmission unit configured to transmit a data packet from a real-time application via a communication channel to a receiver-side data transmission unit; and
 the receiver-side data transmission unit configured to receive the data packet from the transmitter-side data transmission unit via the communication channel;
 wherein
  the transmitter-side data transmission unit includes
   at least one transmitter-side data output/reception unit; and
   at least one transmitter-side availability determination unit; and
  the receiver-side data transmission unit includes
   at least one receiver-side data output/reception unit; and
   at least one receiver-side availability determination unit;
  the at least one transmitter-side data output/reception unit is configured to
   receive a data transmission request for the data packet from the real-time application operatively connected to the transmitter-side data transmission unit;
   transmit a first portion of the data packet from the transmitter-side data transmission unit to the receiver-side data transmission unit via the communication channel;
   receive at the transmitter-side data transmission unit an availability indicator for the communication channel from the receiver-side data transmission unit; and
   if the at least one transmitter-side availability determination unit determines the communication channel is available,
    configure a portion of the data packet not yet transmitted for transmission within an available remainder of a maximum permissible data transmission time determined by the real-time application for the data packet, and
    transmit the portion of the data packet not yet transmitted from the at least one data output/reception unit to the receiver-side data transmission unit via the communication channel, and
  the at least one receiver-side data output/reception unit is configured to
   receive the first portion of the data packet from the at least one transmitter-side data transmission unit via the communication channel;
   transmit the availability indicator based on the determined communication channel availability to the transmitter-side data transmission unit, the availability indicator being determined by the at least one receiver-side availability determination unit based on
    parameters of the communication channel measured during the receiving of the first portion of the data packet, and
    estimated parameters of the communication channel for the portion of the data packet not yet transmitted from the transmitter-side data transmission unit to the receiver-side data transmission unit within the available remainder of the maximum permissible data transmission time, and if the availability indicator indicates the communication channel is available, receiving the portion of the data packet not yet transmitted from the transmitter-side data transmission unit via the communication channel.

16. A vehicle, comprising:
a transmitter-side data transmission unit configured to transmit a data packet from a real-time application via a communication channel to a receiver-side data transmission unit, the transmitter-side data transmission unit including:
   at least one transmitter-side data output/reception unit; and
   at least one availability determination unit configured to determine an availability of the communication channel between the at least one transmitter-side data output/reception unit and at least one receiver-side data transmission unit based on parameters of the communication channel measured during transmission of a first portion of the data packet,
   wherein the at least one transmitter-side data output/reception unit is configured to
      receive a data transmission request for the data packet from the real-time application operatively connected to the transmitter-side data transmission unit;
      transmit the first portion of the data packet from the transmitter-side data transmission unit to the receiver-side data transmission unit via the communication channel;
      receive at the transmitter-side data transmission unit an availability indicator for the communication channel in the form of an availability code from the receiver-side data transmission unit; and
      if the at least one availability determination unit determines the communication channel is available,
         configure a portion of the data packet not yet transmitted for transmission within an available remainder of a maximum permissible data transmission time determined by the real-time application for the data packet, and
         transmit the portion of the data packet not yet transmitted from the at least one data output/reception unit to the receiver-side data transmission unit via the communication channel; and
a vehicle processor configured to execute the real-time application.

17. The vehicle as claimed in claim 16, wherein the real-time application is a driver-assistance functionality.

18. A vehicle, comprising:
a receiver-side data transmission unit configured to receive a data packet from a real-time application transmitted by a transmitter-side data transmission unit via a communication channel, comprising:
   at least one receiver-side data output/reception unit; and
   at least one availability determination unit configured to determine an availability of the communication channel between the at least one receiver-side data output/reception unit and at least one transmitter-side data transmission unit based on parameters of the communication channel measured during the receiving of the first portion of the data packet,
   wherein
      the at least one receiver-side data output/reception unit is configured to
         receive a first portion of the data packet from the at least one transmitter-side data transmission unit via the communication channel;
         transmit an availability indicator in the form of an availability code based on the determined communication channel availability to the transmitter-side data transmission unit, the availability indicator being determined by the at least one availability determination unit based on
         parameters of the communication channel measured during the receiving of the first portion of the data packet, and
         estimated parameters of the communication channel for a portion of the data packet not yet transmitted from the transmitter-side data transmission unit to the receiver-side data transmission unit within an available remainder of a maximum permissible data transmission time, and
         if the availability indicator indicates the communication channel is available, receiving the portion of the data packet not yet transmitted from the transmitter-side data transmission unit via the communication channel; and
a vehicle processor configured to execute the real-time application.

19. The vehicle as claimed in claim 18, wherein the real-time application is a driver-assistance functionality.

* * * * *